US012621271B2

(12) United States Patent
Wang et al.

(10) Patent No.: US 12,621,271 B2
(45) Date of Patent: May 5, 2026

(54) ZERO-TRUST NETWORK ACCESS (ZTNA) SECURE TRAFFIC FORWARDING

(71) Applicant: Fortinet, Inc., Sunnyvale, CA (US)

(72) Inventors: Ying Li Wang, Burnaby (CA); Wenping Luo, Burnaby (CA); Feng Han, Burnaby (CA); Weining Wu, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 137 days.

(21) Appl. No.: 18/400,183

(22) Filed: Dec. 29, 2023

(65) Prior Publication Data

US 2025/0220001 A1     Jul. 3, 2025

(51) Int. Cl.
*H04L 9/40*          (2022.01)

(52) U.S. Cl.
CPC ...... *H04L 63/0414* (2013.01); *H04L 63/0435* (2013.01); *H04L 63/16* (2013.01)

(58) Field of Classification Search
CPC .. H04L 63/0414; H04L 63/0435; H04L 63/16
See application file for complete search history.

(56) References Cited

U.S. PATENT DOCUMENTS

| | | | |
|---|---|---|---|
| 11,882,117 B1 * | 1/2024 | Kumar | H04L 63/0853 |
| 2021/0234860 A1 * | 7/2021 | Bansal | H04L 67/51 |
| 2022/0029988 A1 * | 1/2022 | Levin | H04L 63/0869 |
| 2022/0222347 A1 * | 7/2022 | Sheth | H04L 9/0869 |

| | | | |
|---|---|---|---|
| 2023/0128578 A1 * | 4/2023 | Lenrow | H04W 12/08 |
| | | | 455/411 |
| 2024/0022555 A1 * | 1/2024 | Koikara | H04L 63/0428 |
| 2024/0114036 A1 * | 4/2024 | May | H04L 63/108 |
| 2024/0163261 A1 * | 5/2024 | Crabtree | H04L 9/3239 |
| 2024/0185191 A1 * | 6/2024 | Bernardi | H04L 9/50 |
| 2024/0364678 A1 * | 10/2024 | Koikara | H04L 63/0428 |
| 2024/0396938 A1 * | 11/2024 | Parla | H04L 63/20 |
| 2024/0414168 A1 * | 12/2024 | Lety | H04L 63/0823 |
| 2024/0414201 A1 * | 12/2024 | Lety | H04L 63/0281 |
| 2025/0023915 A1 * | 1/2025 | Koikara | H04L 63/0281 |
| 2025/0039196 A1 * | 1/2025 | Crabtree | G06F 21/6218 |
| 2025/0080504 A1 * | 3/2025 | Obulareddy | H04L 63/0272 |
| 2025/0119471 A1 * | 4/2025 | Parla | H04L 12/4633 |

* cited by examiner

*Primary Examiner* — Khalid M Almaghayreh
(74) *Attorney, Agent, or Firm* — Jaffery Watson Hamilton & DeSanctis LLP

(57)          ABSTRACT

Systems and methods for performing zero-trust network access (ZTNA) secure traffic forwarding are provided. In one example, as part of setting up a transmission control protocol (TCP) forward access proxy (TFAP) tunnel, between a target service and an endpoint security agent of an endpoint device through which an application running on the endpoint device can interact with the target service, a secure connection is established between the endpoint security agent and a ZTNA access proxy (AP). Based on an encryption status of traffic transmitted from the application to the target service: (i) protection against eavesdropping by a man-in-the-middle attacker is provided by using the secure connection to encrypt one or more critical messages of the traffic between the endpoint security agent and the ZTNA AP; and (ii) the endpoint security agent abstains from switching to bypassing mode through the TFAP tunnel until after the one or more critical messages of the traffic have been exchanged.

18 Claims, 5 Drawing Sheets

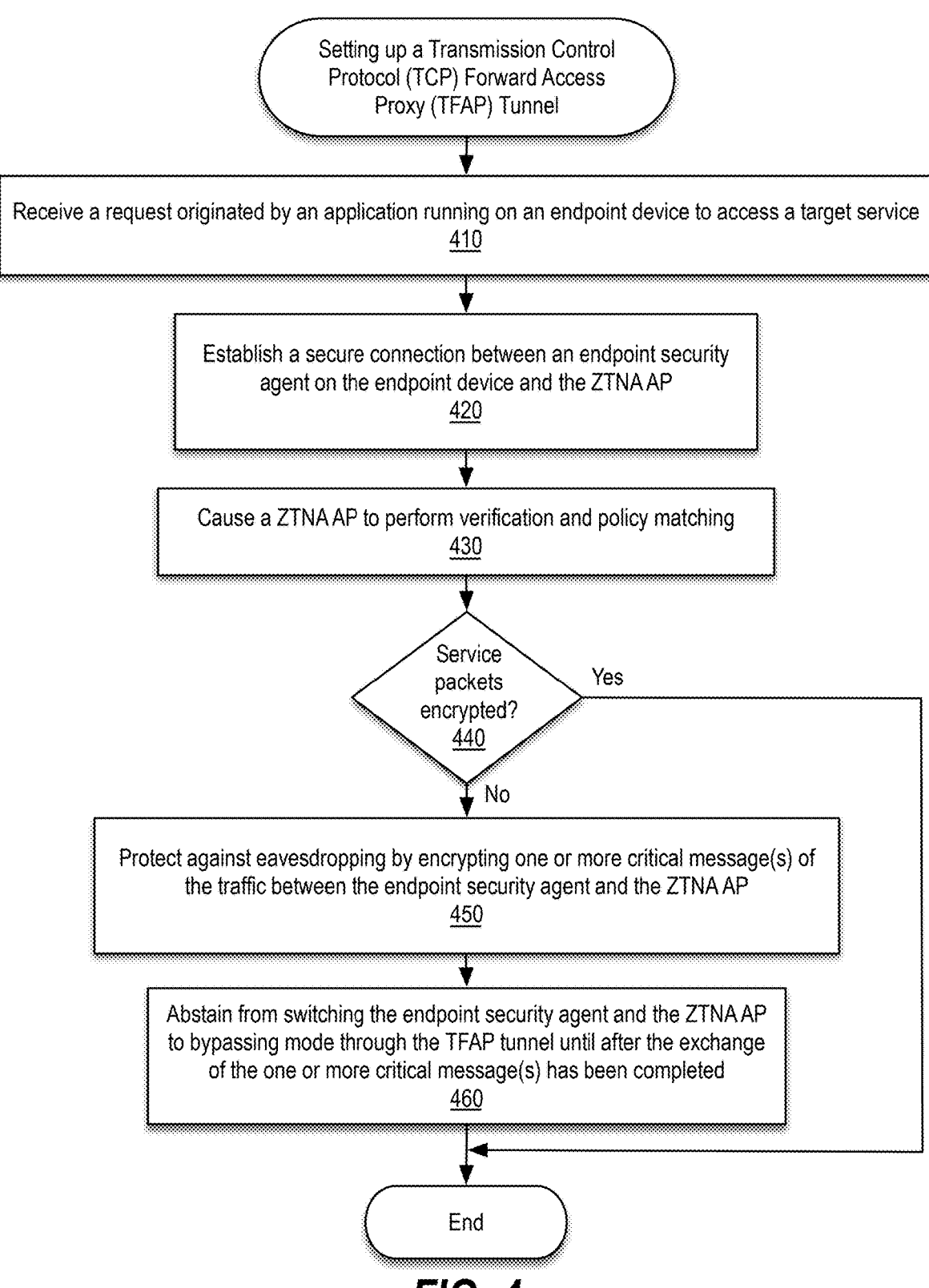

Setting up a Transmission Control
Protocol (TCP) Forward Access
Proxy (TFAP) Tunnel Receive a request originated by an application running on an endpoint device to access a target service
410

Establish a secure connection between an endpoint security
agent on the endpoint device and the ZTNA AP
420

Cause a ZTNA AP to perform verification and policy matching
430

Service
packets
encrypted?
440

Yes

No

Protect against eavesdropping by encrypting one or more critical message(s) of
the traffic between the endpoint security agent and the ZTNA AP
450

Abstain from switching the endpoint security agent and the ZTNA AP
to bypassing mode through the TFAP tunnel until after the exchange
of the one or more critical message(s) has been completed
460

End

*FIG. 4*

ZERO-TRUST NETWORK ACCESS (ZTNA) SECURE TRAFFIC FORWARDING

BACKGROUND

Field

Various embodiments of the present disclosure generally relate to zero-trust network access (ZTNA). In particular, some embodiments relate to secure traffic forwarding when making use of a ZTNA access point (AP) to facilitate access by a client application (e.g., a browser) to a protected transmission control protocol (TCP) application (or a target service).

Description of the Related Art

A ZTNA AP allows users to securely access resources through a Secure Sockets Layer (SSL) or Transport Layer Security (TLS) encrypted access proxy. This simplifies remote access by eliminating the use of dial-up Virtual Private Networks (VPNs). ZTNA rules and tagging offer additional identity and posture checking. For example, by establishing a ZTNA network connection, a virtual tunnel can be provided between an endpoint security agent running on a client device (e.g., a workstation, a laptop computer, a desktop computer, a tablet computer, or the like) through which a client application (e.g., a browser) and a target service may exchange service packets. The policies on the ZTNA AP control what devices and users can access the target service (which may also be referred to herein as a protected service as the ZTNA AP is limiting access to the service). Once the session matches a policy, the ZTNA AP sets up a proxy tunnel session (e.g., a TCP forwarding access proxy (TFAP) tunnel) between the peers (e.g., the endpoint security agent, acting as a proxy on behalf of the client application and the target service).

SUMMARY

Systems and methods are described for performing ZTNA secure traffic forwarding. According to one embodiment, as part of setting up a transmission control protocol (TCP) forward access proxy (TFAP) tunnel, between a target service and an endpoint security agent, operable on an endpoint device and through which an application running on the endpoint device can interact with the target service, a secure connection is established between the endpoint security agent and a ZTNA access point (AP). Based on an encryption status of traffic transmitted from the application to the target service via the endpoint security agent: (i) protection against eavesdropping by an attacker logically positioned between the endpoint security agent and the ZTNA AP is provided by using the secure connection to encrypt one or more critical messages of the traffic between the endpoint security agent and the ZTNA AP; and (ii) the endpoint security agent abstains from switching to bypassing mode through the TFAP tunnel until after the one or more critical messages of the traffic have been exchanged.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 4 is a flow diagram illustrating a set of operations for setting up a TFAP tunnel in accordance with an embodiment of the present disclosure.

DETAILED DESCRIPTION

Figure 1:
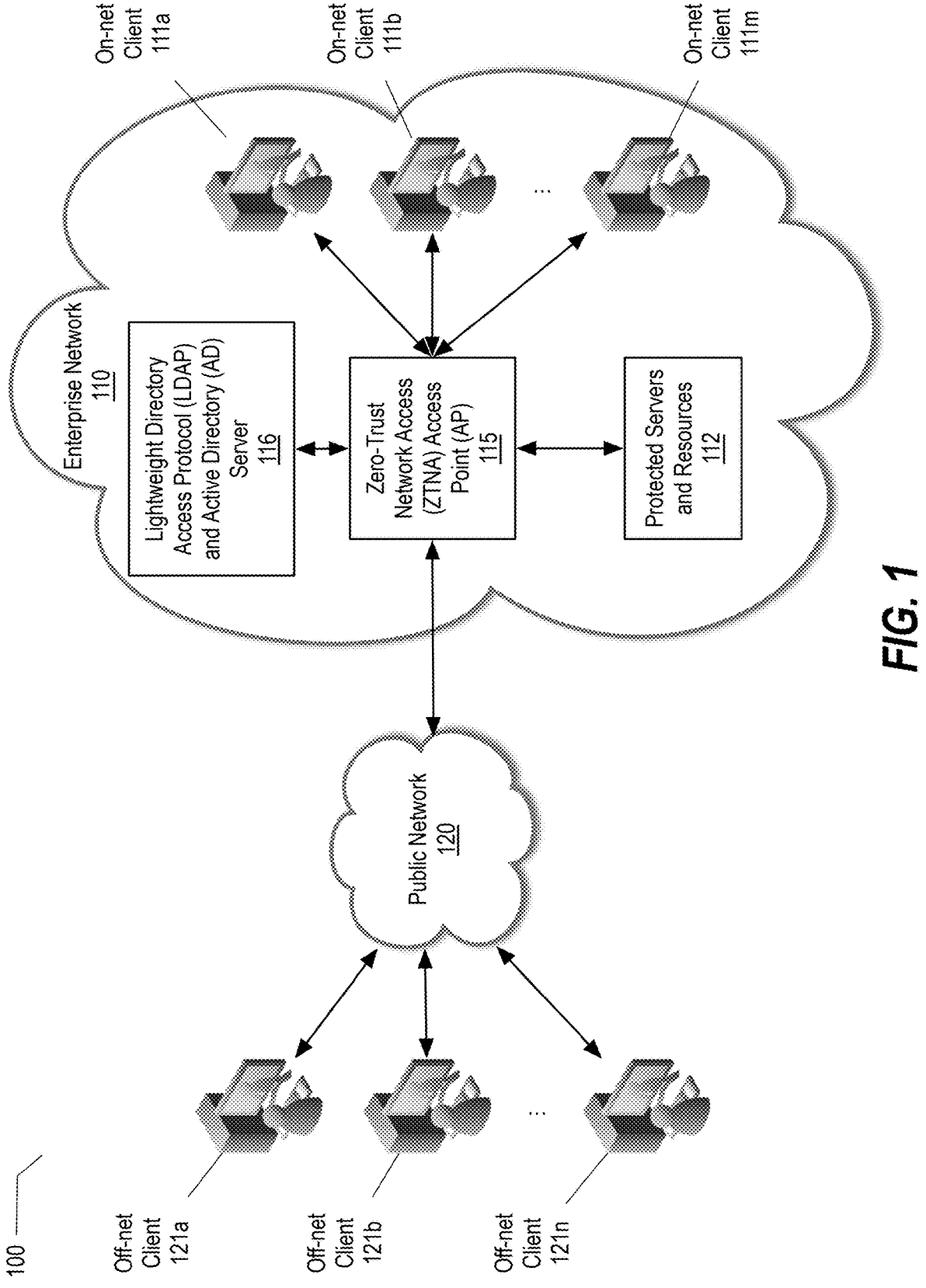
FIG. 1 is a block diagram illustrating an operating environment in which various embodiments of the present disclosure may be employed.

Systems and methods are described for performing ZTNA secure traffic forwarding. In the context of cryptography and cybersecurity, a man-in-the-middle (MITM) attack is a cyberattack in which an attacker, which has inserted itself between or otherwise is logically positioned between two entities, eavesdrops on the communications between the two entities, for example, by secretly relaying the communications. Existing ZTNA APs may use tunnel technology to tunnel service packets between an endpoint (or client) device on which a client application (e.g., a browser) runs and a protected service (a target service) to which the policies on the ZTNA AP allow access. If the ZTNA AP utilizes non-encrypted tunnel technology, there is a potential for information leakage or malicious activity due to a MITM attack. While the use of encrypted tunnel technology may prevent MITM attacks, a naïve implementation may re-encrypt already encrypted tunnel traffic, thereby reducing performance.

Embodiments described herein seek to address or at least mitigate the limitations mentioned above by selectively maintaining a secure connection between the ZTNA AP and an endpoint security agent to ensure certain critical messages (e.g., initial one or more handshake messages associated with an encryption protocol for encrypting content tunneled through the TFAP tunnel) remain hidden before the final tunnel gets encrypted according to the different encryption protocols (e.g., SSL/TSL, SSH, QUIC, etc.) that may be used in the tunnel. As discussed further below, in this manner, when the target service in the tunnel is not peer-to-peer encrypted (e.g., encrypted between the client application and the target service), the SSL or TLS layer of the secure connection that is between the endpoint security agent and the ZTNA AP may retained at least temporarily and be used to protect critical messages from potential eavesdropping by a MITM. However, when the target service in the tunnel is peer-to-peer encrypted, the SSL or TLS layer of the secure connection can be torn off and the tunneled content can simply be forwarded by the ZTNA AP through the TFAP tunnel. This tunnel can provide better performance than an SSL/TLS VPN as well as a naïve encrypted tunnel technology implementation that simply maintains the secure connection throughout the exchange of service packets between the client application and the target service.

While various examples herein may be described with reference to various examples of encryption protocols (e.g., SSL/TSL, SSH, QUIC, etc.) used to encrypt content (e.g., service packets exchanged between a client application and a target service) tunneled through a TFAP tunnel, it is to be appreciated the methodologies described herein are equally applicable to other current or future encryption protocols.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The term "client" generally refers to an application, program, process or device in a client/server relationship that requests information or services from another program, process or device (a server) on a network. Importantly, the terms "client" and "server" are relative since an application may be a client to one application but a server to another. The term "client" also encompasses software that makes the connection between a requesting application, program, process or device to a server possible, such as a file transfer protocol (FTP) client.

The phrase "endpoint protection platform" generally refers to cybersecurity monitoring and/or protection functionality performed on behalf of an endpoint (or client) device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may provide monitoring and/or protection functionality on behalf of the endpoint device via an agent, which may be referred to herein as an "endpoint security agent," that is deployed on the endpoint device. Non-limiting examples of an endpoint protection platform include the FORTIEDR Software as a Service (SaaS) platform and the FORTICLIENT integrated endpoint protection platform available from Fortinet, Inc. of Sunnyvale, CA. In some examples, the endpoint protection platform is a participant in a cybersecurity mesh architecture (CSMA) in which various cybersecurity products/solutions/tools of a given cybersecurity or networking security vendor or across a group of participating vendors achieve a more integrated security policy by facilitating interoperability and communication among the various cybersecurity products/solutions/tools (e.g., network security appliances, a secure access service edge (SASE) platform, etc.)

The phrase "endpoint security agent" generally refers to endpoint software that runs on an endpoint device (e.g., a desktop computer, a laptop computer, or a mobile device) and monitors for cybersecurity issues arising on the endpoint device and/or protects the endpoint device against cybersecurity issues. In some examples, the endpoint security agent may be deployed on the endpoint device in the form of a fabric agent that delivers protection, compliance, and secure access in a single, modular lightweight client. A fabric agent may be endpoint software that runs on an endpoint device and communicates with a telemetry connection or a cybersecurity mesh (e.g., the Fortinet Security Fabric available from Fortinet, Inc. of Sunnyvale, CA) to provide information, visibility, and control to that device. In some examples, the endpoint security agent may be in the form of a lightweight endpoint agent that utilizes less than one percent of CPU and less than 100 MB of RAM and may leverage, among other things, various security event classification sources provided within one or more associated cloud-based security services. A non-limiting example of an endpoint security agent is the FORTICLIENT Fabric Agent available from Fortinet, Inc. of Sunnyvale, CA. In one example, to simplify the initial deployment and offload ongoing monitoring, an endpoint security agent may be managed and/or supported by one or more endpoint-focused managed services, for example, to provide set up, deployment, configuration, vulnerability monitoring, and overall endpoint security monitoring. In the context of a CSMA, the endpoint security agent may communicate with an endpoint protection platform, one or more network security appliances, and/or one or more cloud-based security services via a telemetry connection and/or via application programming interface (API) integration. In some examples, the endpoint security agent enables remote workers to securely connect to the network using zero-trust principles and may enables both Universal ZTNA- and Virtual Private Network (VPN)-encrypted tunnels, as well as URL filtering and cloud access security broker (CASB). The endpoint security agent may additionally provide enhanced security capabilities through artificial intelligence (AI)-based NGAV, endpoint quarantine, and application firewall, as well as support for cloud sandbox, USB device control, and ransomware protection.

As used herein, a "network security appliance" or a "network security device" generally refers to a device or appliance in virtual or physical form that is operable to perform one or more security functions. A network security device may reside within the particular network that it is protecting, or network security may be provided as a service with the network security device residing in the cloud. Some network security devices may be implemented as general-purpose computers or servers with appropriate software operable to perform one or more security functions. Other network security devices may also include custom hardware (e.g., one or more custom Application-Specific Integrated Circuits (ASICs)). For example, while there are differences among network security device vendors, network security devices may be classified into three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines one or more CPUs, CPs, NPs. Mid-range network security devices may include one or more multi-core CPUs, one or more separate NP Application-Specific Integrated Circuits (ASICs), and one or more separate CP ASICs. At the high-end, network security devices may have multiple NPs and/or multiple CPs. A network security device is typically associated with a particular network (e.g., a private enterprise network) on behalf of which it provides one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data loss prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DOS attack detection appliances (e.g., the FORTIDDOS family of DOS attack detection and mitigation appliances).

As used herein, "Zero-Trust Network Access" or "ZTNA" generally refer to a set of technologies and functionalities that enable secure access to internal applications for local or remote users (e.g., utilizing on-net endpoint or client devices within an enterprise network or off-net endpoint or client devices outside of the enterprise network, respectively). ZTNA represents the evolution of VPN remote access, bringing the zero-trust model to application access. ZTNA may be used to authenticate and authorize access to resources based on identity, device and/or contextual data. ZTNA solutions typically grant access on a per-session basis to individual applications only after devices and users are verified As used herein, a "TCP forwarding access proxy" or "TFAP" generally refer to a reverse proxy that forwards TCP traffic to a protected resource. In various examples described herein, the TFAP is operable within a ZTNA AP and tunnels TCP traffic between an endpoint device and the ZTNA AP over a secure connection (e.g., HTTPS), and forwards the TCP traffic to the protected resource. In various cases, the TFAP represents a layer 7 reverse proxy that can check, for example, endpoint device identity, user identity, enforce access proxy policy to a designated protected resource, and/or performing security scans.

As used herein, a "ZTNA Access Point" or "ZTNA AP" generally refer to any hardware device, software application, or combination of hardware and software that may be used to control access to protected network devices, servers, resources, services, TCP applications, and/or databases by a requesting endpoint device. In some cases, a ZTNA AP runs one or more access proxies, for example, including a TFAP. Depending on the particular implementation, a ZTNA may be provided in virtual or physical form. For example, a ZTNA AP may be a virtual node or container that runs the one or more access proxies or a network security appliance (e.g., a UTM appliance) that runs the one or more access proxies.

As used herein, a "secure connection" generally refers to a connection provided through a computer network by one or more protocols that secures communication and data transfers via the connection, for example, via end-to-end encryption. Non-limiting examples by which a secure connection may be established include HTTPS, Hypertext Transport Protocol version 1.1 (HTTP 1.1) over SSL, Hypertext Transfer Protocol version 2.0 (HTTP 2.0) over SSL, Hypertext Transfer Protocol version 3.0 (HTTP 3.0) over Quick User Datagram Protocol (UDP) Internet Connections (QUIC).

As used herein, a "critical message" generally refers to one or more initial handshake messages of an encryption protocol that are exchanged between a client application and a target service to facilitate encryption of content tunneled through a TFAP tunnel. Such critical messages if intercepted by an attacker (a MITM) may be used by the attacker to pretend to be the client application, for example, by creating a forged handshake (e.g., a forged SSL/TLS handshake). In some examples, one or more critical messages are considered part of the service packets associated with the target service. Non-limiting examples of the encryption protocol include SSL/TLS, the Secure Shell (SSH) Transport Layer protocol (which may simply be referred to as SSH herein), and QUIC. With respect to the SSL/TLS protocol, a non-limiting example of a critical messages includes the ClientHello message of the SSL/TLS handshake. With respect to SSH, non-limiting examples of critical messages include all initial messages of the service packets until the key exchange (i.e., SSH_MSG_KEXINT) has been completed (e.g., as indicated by SSH_MSG_NEWKEYS). With respect to QUIC, non-limiting examples of critical messages include one or more initial messages of the service packets until the Encryption-Confirmation is received.

Example Operating Environment

FIG. 1 is a block diagram illustrating an operating environment 100 in which various embodiments of the present disclosure may be employed. In the context of the present example, multiple off-net clients 121a-n access an enterprise network 110 via a public network 120 (e.g., the Internet). The off-net clients 121a-n may represent endpoint or client devices (e.g., workstations, desktop computers, laptop computers, or mobile devices) used by remote workers associated with a particular organization or enterprise.

The enterprise network 110 is shown including a Lightweight Directory Access Protocol (LDAP) and Active Directory (AD) server 116, a ZTNA AP 115, protected servers and resources 112, and multiple on-net clients 111a-m (e.g., locally attached client devices used by onsite workers). In one embodiment, the ZTNA AP 115 is a network security appliance operable within the enterprise network 110. The ZTNA AP 115 may be responsible for controlling access to the protected servers and resources 112, which may include various protected network devices, servers, resources, services, TCP applications, and/or databases. For example, as is known in the art, the ZTNA AP 115 may evaluate policies to determine what devices and users can access a given target service of the protected servers and resources 112.

As described further below, when a given user session matches a policy, the ZTNA AP 115 may sets up a proxy tunnel session (e.g., a TFAP tunnel) between an endpoint security agent (not shown), running on a requesting endpoint device (e.g., one of off-net clients 121a-n or one of on-net clients 111a-m) and acting as a proxy on behalf of a client application (e.g., a browser), and the target service. In some cases, the evaluation of the policies may include consulting the LDAP and AD server 116 regarding a user's AD group and/or domain. For example, access to one or more of the protected servers and resources 112 may be limited to a requesting endpoint that belongs to AD. In some examples, access to certain Virtual Local Area Networks (VLANs) may be based on the logged in user's AD group membership. Deny policies can be used with endpoints when they fall outside of security posture policies, for example, access may be denied to certain resources or network segments if an endpoint is tagged with critical vulnerabilities.

In one embodiment, the ZTNA AP 115 seeks to address or at least mitigate various limitations associated with existing ZTNA APs in relation to performance issues and exposure to MITM attacks by, during establishment of the TFAP tunnel, selectively maintaining a secure connection between the ZTNA AP 115 and the endpoint security agent to ensure certain critical messages (e.g., initial handshake messages associated with an encryption protocol used for tunneled traffic) remain hidden before the service packets exchanged through the TFAP tunnel are encrypted according to the different protocols in the tunnel. A non-limiting example of how the ZTNA AP 115 may set up a TFAP tunnel is described further below with reference to FIG. 4. Once the TFAP tunnel is established, The ZTNA AP can enter bypassing mode to begin forwarding the service packets between the client application and the target service via the TFAP tunnel. In this manner, client devices may be provided with seamless access to protected resources (e.g., servers, TCP applications, and the like), without needing to form Internet Protocol Security (IPsec) or SSL VPN tunnels.

Traditional Approach for Establishment of a TFAP Tunnel

Figure 2:
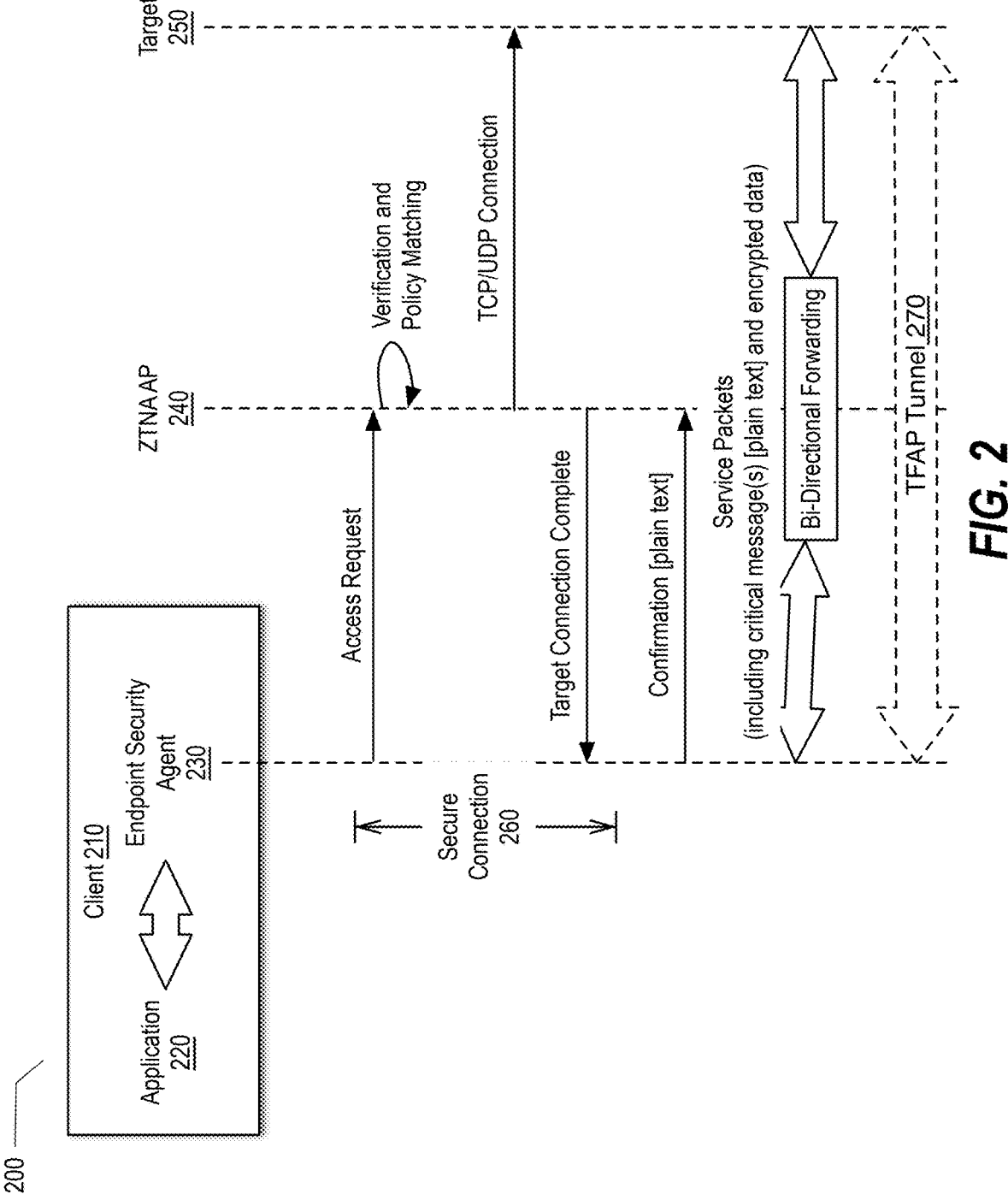
FIG. 2 is a message sequence diagram illustrating a traditional approach for setting up a TFAP tunnel.

FIG. 2 is a message sequence diagram 200 illustrating a traditional approach for setting up a TFAP tunnel 270. In this example, establishment of the TFAP tunnel 270 starts from a secure connection 260 (e.g., an HTTPS stream) established between an endpoint security agent 230 and a ZTNA AP 240 protecting a set of one or more protected resources. The endpoint security agent 230 is operable on the client device and acts as a proxy on behalf of a client application (e.g., application 220). The set of one or more protected resources include a target service (e.g., target 250) to which the client application is attempting to access.

The endpoint security agent 230 may configure the secure connection 260 by pointing to the proxy gateway, and then specifying within an access request a destination host that it wants to reach on behalf of the client application (e.g., a browser). The secure connection 260 may be made to a VIP address of the ZTNA AP 240, for example, where the client application's certificate is verified, and access is granted based on the ZTNA rules. For example, the ZTNA AP 240 may perform verification and policy matching, to among other things, authenticate the client device, the associated user, and authorize or deny access to the target service, for example, based on network tuples, device security tags, and the like As can be seen in FIG. 2, assuming access to the target service is granted to the client device and after the access request is finished or after the endpoint security device 230 is informed, for example, via a target connection complete message of a protocol between the endpoint security agent 230 and the ZTNA AP 240, that the TCP/UDP connection between the ZTNA AP 240 and the target 250 has been established, the secure connection 260 will end-up being switched to the TFAP tunnel 270, which may be managed by a TFAP (not shown) operable within the ZTNA AP 240. For example, the endpoint security agent 230 and the ZTNA AP 240 may drop the SSL encryption (or other encryption) of the secure connection 260 and switch to a bypassing mode in which the secure connection 260 is no longer utilized and instead, service packets between the client application and the target service will be forwarded as "plain text" via the TFAP tunnel 270.

Notably, plain text in this context is from the perspective of the endpoint security agent and the ZTNA AP 240. So, to the extent the service packets (including critical messages of an encryption protocol exchanged between the client application and the target service to facilitate encryption of the tunneled content) are peer-to-peer encrypted between the client application and the target service, there is no need for concern regarding the potential for a MITM attack. However, as discussed further below with reference to FIG. 3, if the service packets are not peer-to-peer encrypted between the client application and the target service, there is a potential for a MITM attack (e.g., eavesdropping, information leakage, and/or malicious activity on the part of the MITM).

Example of MITM Attack

Figure 3:
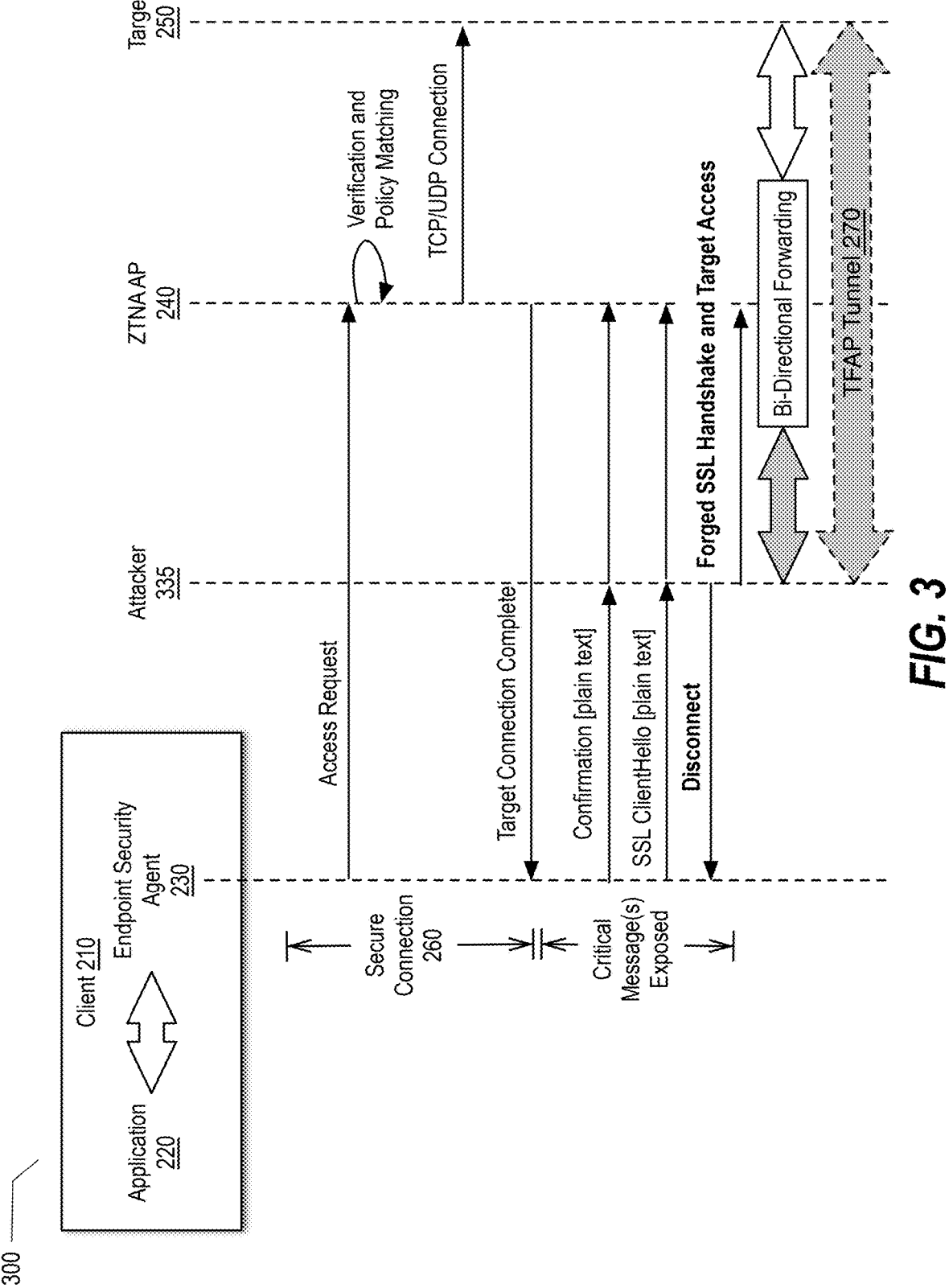
FIG. 3 is a message sequence diagram illustrating potential malicious action that may be taken by an attacker during establishment of the TFAP tunnel.

FIG. 3 is a message sequence diagram 300 illustrating potential malicious action that may be taken by an attacker 335 during establishment of the TFAP tunnel 270. In the context of the present example, it is assumed the service packets (which include the initial exchange of one or more critical messages, e.g., one or more handshake messages of an encryption protocol that facilitates encryption of content to be tunneled through the TFAP tunnel 270) are not peer-to-peer encrypted between the client application and the target service. It is also assumed an attacker 335 (the MITM) has inserted itself between or is otherwise logically positioned between the endpoint security agent 230 and the ZTNA AP 240. The potential risk of an MITM attack by the attacker 335 breaks the mutual-trust assumption between the endpoint security agent 230 and the target service. For example, because the service packets (which include the initial exchange of one or more critical messages, such as handshake messages between the client application and the target service) are not encrypted, for example,) are not peer-to-peer encrypted between the client application and the target service, there is a potential for an MITM attack (e.g., eavesdropping, information leakage, and/or malicious activity on the part of the MITM).

Since in this example, the secure connection 260 is no longer in use and service packets are sent in plain text after receipt of the target connection complete message (under the assumption that the service packets are peer-to-peer encrypted), one or more critical messages (e.g., handshake messages to establish an encryption key) are forwarded by the endpoint security agent 230 via the TFAP tunnel 270 as plain text, thereby leaving them exposed. For example, the attacker 335 may monitor the data in the TFAP session. The attacker 335 may intercept and then bypass the first SSL handshake message (e.g., an SSL ClientHello) for ZTNA access, but may then disconnect the endpoint security agent 230 once the second SSL handshake message is observed, which means the TFAP tunnel 270 has been established. Then, the attacker 335 can start a new session to the target based on a forged SSL handshake created based on the intercepted SSL ClientHello. For its part, the ZTNA AP 240, believing it is still communicating with the endpoint security agent 230 will reuse the client device information and user information in the TFAP tunnel. In this manner, the attacker 335 is able to connect to the target service successfully without providing any device or user information to the ZTNA AP 240. For example, as illustrated by the gray background of the bi-directional forwarding arrow and the TFAP tunnel 270, the service packets are being exchanged between the attacker 335 and the target service rather than between the client application (via the endpoint security agent 230) and the target service as intended by the client application.

Example TFAP Tunnel Setup for Secure Traffic Forwarding

FIG. 4 is a flow diagram illustrating a set of operations for setting up a TFAP tunnel (e.g., TFAP tunnel 270) in accordance with an embodiment of the present disclosure. In one embodiment, the processing described with reference to FIG. 4 is performed by an endpoint security agent (e.g., endpoint security agent 230) of a client device (e.g., one of off-net clients 121*a-n* or on-net clients 111*a-m*). In various embodiments, the general idea is to selectively determine whether to maintain a secure connection (e.g., secure connection 260) between a ZTNA AP (e.g., ZTNA AP 115) and the endpoint security agent for a sufficient duration to ensure certain critical messages (e.g., an initial one or more handshake messages associated with an encryption protocol for encrypting content tunneled through the TFAP tunnel) remain hidden before the TFAP tunnel is encrypted according to one of various potential encryption protocols (e.g., SSL/TSL, SSH, QUIC, etc.) that may be used to encrypt application traffic relating to a target service (e.g., target 250) exchanged between a client application (e.g., application 220) and the target service via the TFAP tunnel. For example, assuming the secure connection is established via HTTPS, the endpoint security agent and the ZTNA AP may delay switching to bypassing mode beyond completion of the HTTPS access request. Instead, both the endpoint security agent and the ZTNA AP may maintain the SSL encryption of the HTTPS session until encryption parameters (e.g., an encryption key) have been established for encrypting the tunneled content, or there is no chance for an MITM attack (i.e., when the target service in the tunnel is peer-to-peer encrypted between the client application and the target service). In various examples, this may be accomplished by checking the message types of one or more critical messages (e.g., handshake messages) exchanged between the client application (e.g., a browser) and the target service and continuing to encrypt the one or more critical messages via the secure connection until a predetermined or configurable critical message has been exchanged between the client application and the target service.

At block 410, a request (e.g., an HTTPS access request) originated by the client application (e.g., a browser) of the client device is received by the endpoint security agent. The request includes information indicative of the target service.

At block 420, a secure connection (e.g., secure connection 260) is established (e.g., via HTTPS) between the endpoint security agent and the ZTNA AP.

At block 430, the endpoint security agent causes the ZTNA AP to perform verification and policy matching by relaying the access request to the ZTNA AP via the secure connection between the endpoint security agent and the ZTNA AP. Assuming the ZTNA AP has granted the client application access to the target service, the ZTNA may further establish a TCP/UDP connection with the target service and return a target connection complete message to the endpoint security agent (e.g., as shown in FIG. 2) notifying the endpoint security agent of same. At this point, rather than immediately dissolving the secure connection and commencing plain text forwarding, the secure connection may be selectively maintained to ensure one or more critical messages initially exchanged between the client application and the target service (as well as the confirmation message sent from the endpoint security agent 230 to the ZTNA AP) are encrypted and protected against potential eavesdropping by a MITM attacker by continuing with decision block 440.

At decision block 440, the endpoint security agent makes a determination regarding whether the service packets are encrypted. If so, processing is complete; otherwise, processing continues with block 450.

At block 450, the endpoint security agent protects against eavesdropping by encrypting one or more critical messages of the traffic between the endpoint security agent and the ZTNA AP via the secure connection, thereby extending the protection provided by the secure connection beyond the completion of the access request.

At block 460, the endpoint security agent and the ZTNA AP abstain from switching to bypassing mode to start forwarding traffic in plain text via the TFAP tunnel until after the exchange of the one or more critical messages has been completed. For example, rather than immediately dissolving the secure connection and beginning to bypass service packets the secure connection may be maintained. According to one embodiment, before the TFAP tunnel is ready to remove the encryption (e.g., SSL or QUIC) provided by the secure connection, the peers (e.g., the endpoint security agent and the ZTNA AP) will send the real client/server data by adding a header on top of it. This header may indicate whether the content is plain text or a tunnel-ready indicator, which may be different for each of the various potential encryption protocols that may be used to encrypt the service packets. According to one embodiment, when the encryption protocol associated with the target service is SSL/TLS, completion of the SSL/TLS handshake can be detected by checking the SSL handshake message types. As one potential improvement, when the TLS version is greater than or equal to 1.0, then the peers only need to encrypt the ClientHello message as a MITM attacker cannot forge the SSL handshake and pose as the client application without this critical message. When the encryption protocol associated with the target service is SSH completion of the SSH handshake can be detected by checking the SSH handshake message types and maintaining the secure connection until the key exchange (i.e., SSH_MSG_KEXINT) message has been exchanged or until the key exchange has been completed (e.g., as indicated by SSH_MSG_NEWKEYS). Similar to SSL/TLS, a MITM attacker cannot forge the SSH handshake and pose as the client application without the first handshake message. When the encryption protocol associated with the target service is QUIC the approach is slightly different but essentially the same. For example, the completion of the one or more critical messages associated with the QUIC handshake may be determined based on receipt of an Encryption-Confirmation message. In this manner, the performance hit of performing double encryption as well as the exposure to a potential MITM attack are addressed.

While in the context of the example described with reference to the flow diagrams of FIG. 4, a number of enumerated blocks are included, it is to be understood that examples may include additional blocks before, after, and/or in between the enumerated blocks. Similarly, in some examples, one or more of the enumerated blocks may be omitted and/or performed in a different order.

Example Computer System

Embodiments of the present disclosure include various steps, which have been described above. The steps may be performed by hardware components or may be embodied in machine-executable instructions, which may be used to cause one or more processing resources (e.g., one or more general-purpose and/or special-purpose processors) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process.

The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers, physical and/or virtual network security appliances) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 5:
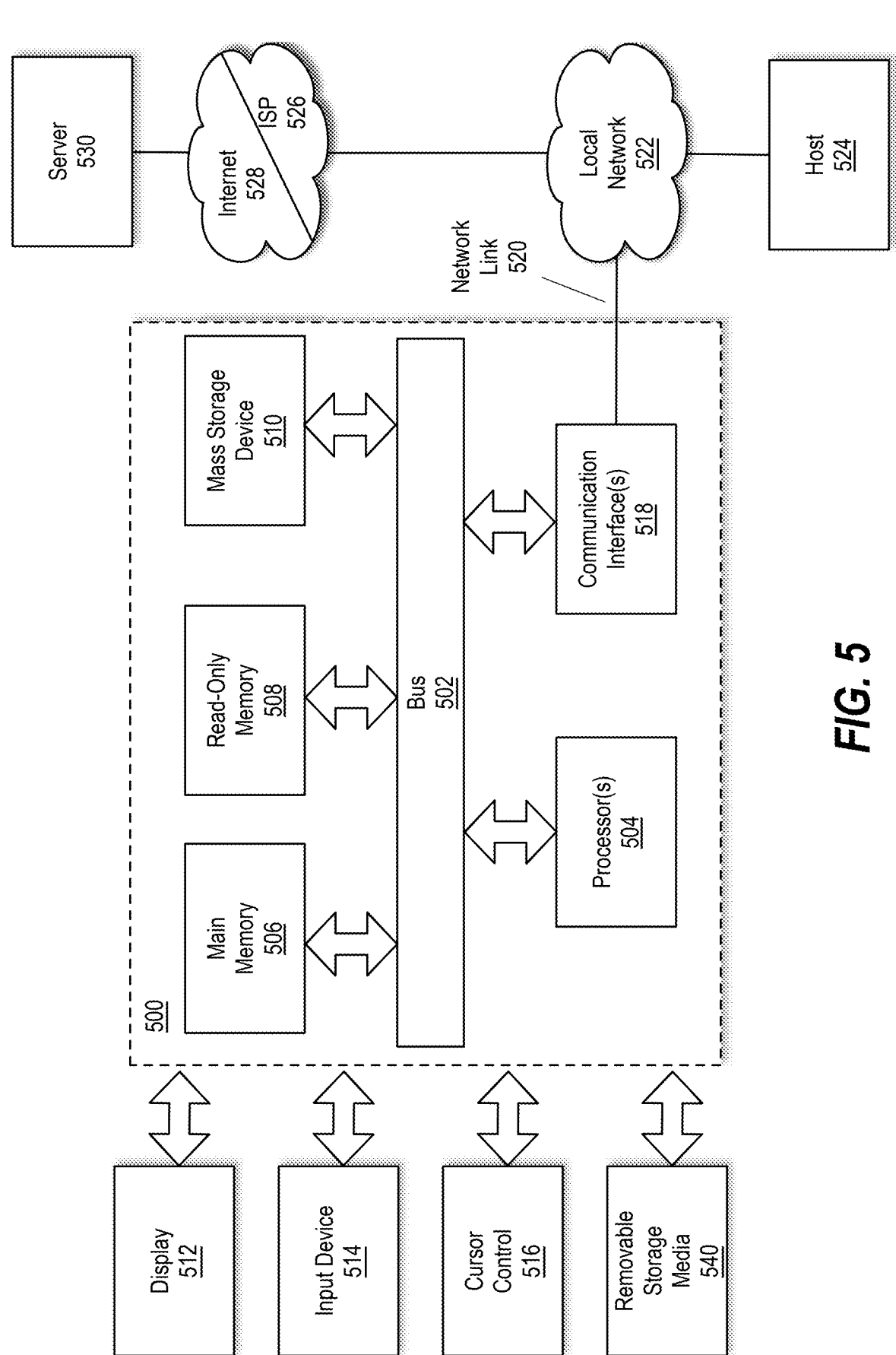
FIG. 5 illustrates an example computer system in which or with which embodiments of the present disclosure may be utilized.

FIG. 5 is a block diagram that illustrates a computer system 500 in which or with which an embodiment of the present disclosure may be implemented. Computer system 500 may be representative of an endpoint or client device (e.g., one of off-net clients 121$a$-$n$ or on-net clients 111$a$-$m$) on which an endpoint security agent is running and acting as a proxy on behalf of a client application (e.g., a browser). Notably, components of computer system 500 described herein are meant only to exemplify various possibilities. In no way should example computer system 500 limit the scope of the present disclosure. In the context of the present example, computer system 500 includes a bus 502 or other communication mechanism for communicating information, and one or more processing resources (e.g., one or more hardware processors 504) coupled with bus 502 for processing information. Hardware processors 504 may include, for example, one or more general purpose microprocessors available from one or more current or future microprocessor manufactures (e.g., Intel Corporation, Advanced Micro Devices, Inc., and/or the like) and/or one or more special purpose processors (e.g., CPs, NPs, and/or accelerators or co-processors). In some examples, the one or more processing resources may be part of an ASIC-based security processing unit (e.g., the FORTISP family of security processing units available from Fortinet, Inc. of Sunnyvale, CA).

Computer system 500 also includes a main memory 506, such as a random access memory (RAM) or other dynamic storage device, coupled to bus 502 for storing information and instructions to be executed by processor(s) 504. Main memory 506 also may be used for storing temporary variables or other intermediate information during execution of instructions to be executed by processor(s) 504. Such instructions, when stored in non-transitory storage media accessible to processor(s) 504, render computer system 500 into a special-purpose machine that is customized to perform the operations specified in the instructions.

Computer system 500 further includes a read only memory (ROM) 508 or other static storage device coupled to bus 502 for storing static information and instructions for processor(s) 504. A storage device 510, e.g., a magnetic disk, optical disk or flash disk (made of flash memory chips), is provided and coupled to bus 502 for storing information and instructions.

Computer system 500 may be coupled via bus 502 to a display 512, e.g., a cathode ray tube (CRT), Liquid Crystal Display (LCD), Organic Light-Emitting Diode Display (OLED), Digital Light Processing Display (DLP) or the like, for displaying information to a computer user. An input device 514, including alphanumeric and other keys, is coupled to bus 502 for communicating information and command selections to processor(s) 504. Another type of user input device is cursor control 516, such as a mouse, a trackball, a trackpad, or cursor direction keys for communicating direction information and command selections to processor(s) 504 and for controlling cursor movement on display 512. This input device typically has two degrees of freedom in two axes, a first axis (e.g., x) and a second axis (e.g., y), that allows the device to specify positions in a plane.

Removable storage media 540 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 500 may implement the techniques described herein using customized hard-wired logic, one or more ASICs or FPGAs, firmware or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 510. Volatile media includes dynamic memory, such as main memory 506. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor(s) 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieve and execute the instructions. The instructions received by main memory 506 may optionally be stored on storage device 510 either before or after execution by processor(s) 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor(s) 504 as it is received, or stored in storage device 510, or other non-volatile storage for later execution.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:

as part of setting up a transmission control protocol (TCP) forward access proxy (TFAP) tunnel, between a zero-trust network access (ZTNA) access point (AP) and an endpoint security agent, through which an application running on an endpoint device accesses a target service, establishing a secure connection between the endpoint security agent and the ZTNA AP;

based on an encryption status of traffic transmitted from the application to the target service via the endpoint security agent:

protecting against eavesdropping by an attacker that has inserted itself between the endpoint security agent and the ZTNA AP, by using the secure connection to encrypt one or more critical messages of the traffic between the endpoint security agent and the ZTNA AP; and abstaining from switching the endpoint security agent to bypassing mode through the TFAP tunnel until after the one or more critical messages of the traffic have been exchanged; and based on determining the traffic is encrypted, avoiding re-encryption of the traffic by forwarding the traffic to the target service via the TFAP tunnel.

2. The method of claim 1, wherein a protocol carrying the traffic comprises secure sockets layer (SSL) protocol or transport layer security (TLS) protocol and wherein the one or more critical messages comprises a client hello message of the SSL protocol or the TLS protocol.

3. The method of claim 1, wherein a protocol carrying the traffic comprises secure shell (SSH) protocol and wherein the one or more critical messages comprises a key exchange initialization (KEXINIT) message of the SSH protocol or a message of the SSH protocol indicating completion of the key exchange.

4. The method of claim 1, wherein a protocol carrying the traffic comprises quick user datagram protocol (UDP) internet connections (QUIC) and wherein the one or more critical messages comprises an encryption confirmation message of the QUIC protocol.

5. The method of claim 1, wherein the secure connection is established via hypertext transfer protocol secure (HTTPS), hypertext transfer protocol version 1.1 (HTTP 1.1) over SSL, hypertext transfer protocol version 2.0 (HTTP 2.0) over SSL, or hypertext transfer protocol version 3.0 (HTTP 3.0) over QUIC.

6. A non-transitory machine readable medium storing instructions associated with an endpoint security agent, which when executed by one or more processing resources of a client device, cause the endpoint security agent to:

during establishment of transmission control protocol (TCP) forward access proxy (TFAP) tunnel between a zero-trust network access (ZTNA) access point (AP) and the endpoint security agent, through which an application running on the client device accesses a target service, establish a secure connection between the endpoint security agent and the ZTNA AP;

based on an encryption status of service packets transmitted from the application to the target service via the endpoint security agent:

protect against eavesdropping by an attacker that has inserted itself between the endpoint security agent and the ZTNA AP, by maintaining the secure connection and encrypting one or more critical messages of the service packets between the endpoint security agent and the ZTNA AP; and abstain from switching the endpoint security agent to bypassing mode through the TFAP tunnel until after exchange of the one or more critical messages of the service packets has been completed; and based on determining the service packets are encrypted, avoiding re-encryption of the service packets by forwarding the service packets to the target service via the TFAP tunnel.

7. The non-transitory machine readable medium of claim 6, wherein a protocol carrying the service packets comprises secure sockets layer (SSL) protocol or transport layer security (TLS) protocol and wherein the one or more critical messages comprises a client hello message of the SSL protocol or the TLS protocol.

8. The non-transitory machine readable medium of claim 6, wherein a protocol carrying the service packets comprises secure shell (SSH) protocol and wherein the one or more critical messages comprises a key exchange initialization (KEXINIT) message of the SSH protocol.

9. The non-transitory machine readable medium of claim 6, wherein a protocol carrying the service packets comprises quick user datagram protocol (UDP) internet connections (QUIC) and wherein the one or more critical messages comprises an encryption confirmation message of the QUIC protocol.

10. The non-transitory machine readable medium of claim 6, wherein the secure connection is established via hypertext transfer protocol secure (HTTPS).

11. The non-transitory machine readable medium of claim 6, wherein the secure connection is established via hypertext transfer protocol version 1.1 (HTTP 1.1) over SSL.

12. The non-transitory machine readable medium of claim 6, wherein the secure connection is established via hypertext transfer protocol version 2.0 (HTTP 2.0) over SSL.

13. The non-transitory machine readable medium of claim 6, wherein the secure connection is established via hypertext transfer protocol version 3.0 (HTTP 3.0) over QUIC.

14. A client device comprising:

one or more processing resources; and instructions that when executed by the one or more processing resources cause an endpoint security agent on the client device to:

during establishment of transmission control protocol (TCP) forward access proxy (TFAP) tunnel between a zero-trust network access (ZTNA) access point (AP) and the endpoint security agent, through which an application running on the client device accesses a target service, establish a secure connection between the endpoint security agent and the ZTNA AP;

based on an encryption status of service packets transmitted from the application to the target service via the endpoint security agent:

protect against eavesdropping by an attacker that has inserted itself between the endpoint security agent and the ZTNA AP, by maintaining the secure connection and encrypting one or more critical messages of the service packets between the endpoint security agent and the ZTNA AP; and abstain from switching the endpoint security agent to bypassing mode through the TFAP tunnel until after exchange of the one or more critical messages of the service packets has been completed; and based on determining the service packets are encrypted, avoid re-encryption of the service packets by forwarding the service packets to the target service via the TFAP tunnel.

15. The client device of claim 14, wherein a protocol carrying the service packets comprises secure sockets layer (SSL) protocol or transport layer security (TLS) protocol and wherein the one or more critical messages comprises a client hello message of the SSL protocol or the TLS protocol.

16. The client device of claim 14, wherein a protocol carrying the service packets comprises secure shell (SSH) protocol and wherein the one or more critical messages comprises a key exchange initialization (KEXINIT) message of the SSH protocol.

17. The client device of claim 14, wherein a protocol carrying the service packets comprises quick user datagram protocol (UDP) internet connections (QUIC) and wherein the one or more critical messages comprises an encryption confirmation message of the QUIC protocol.

18. The client device of claim 14, wherein the secure connection is established via hypertext transfer protocol secure (HTTPS), hypertext transfer protocol version 1.1 (HTTP 1.1) over SSL, hypertext transfer protocol version 2.0 (HTTP 2.0) over SSL, or hypertext transfer protocol version 3.0 (HTTP 3.0) over QUIC.

\* \* \* \* \*